United States Patent
Izuhara et al.

(10) Patent No.: US 10,114,201 B2
(45) Date of Patent: Oct. 30, 2018

(54) ZOOM LENS SYSTEM, IMAGE CAPTURING DEVICE

(71) Applicant: Panasonic Intellectual Property Management Co., Ltd., Osaka (JP)

(72) Inventors: Isamu Izuhara, Osaka (JP); Naoto Nishimura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 11 days.

(21) Appl. No.: 15/464,937

(22) Filed: Mar. 21, 2017

(65) Prior Publication Data
US 2017/0192211 A1 Jul. 6, 2017

Related U.S. Application Data

(63) Continuation of application No. PCT/JP2015/004509, filed on Sep. 7, 2015.

(30) Foreign Application Priority Data

Oct. 2, 2014 (JP) .................................. 2014-203669

(51) Int. Cl.
*G02B 15/177* (2006.01)
*G02B 15/20* (2006.01)

(52) U.S. Cl.
CPC ........... *G02B 15/177* (2013.01); *G02B 15/20* (2013.01)

(58) Field of Classification Search
CPC ................................................... G02B 15/177
(Continued)

(56) References Cited

U.S. PATENT DOCUMENTS

2004/0130647 A1    7/2004 Kuba
2007/0201143 A1*   8/2007 Kohno ..................... G02B 9/34
                                                                    359/680
(Continued)

FOREIGN PATENT DOCUMENTS

JP    2004-205796    7/2004
JP    2007-093955    4/2007
(Continued)

OTHER PUBLICATIONS

International Search Report of PCT application No. PCT/JP2015/004509 dated Oct. 20, 2015.

*Primary Examiner* — James Jones
(74) *Attorney, Agent, or Firm* — Renner Otto Boisselle & Sklar, LLP

(57) ABSTRACT

A zoom lens system includes, in the following order from an object side toward an image side, a first lens group with negative power, a second lens group with positive power, a third lens group with negative power, and a fourth lens group with positive power. The first lens group includes, in the following order from the object side toward the image side, a first lens element having a negative meniscus shape with a concave surface facing the image side, a second lens element having a negative meniscus shape with a concave surface facing the image side, a third lens element with a concave surface facing the image side, a fourth lens element with a convex surface facing the object side, and a fifth lens element with a concave surface facing the object side. The third lens element and the fourth lens element compose a cemented lens.

20 Claims, 9 Drawing Sheets

(58) Field of Classification Search
USPC .......................................................... 359/684
See application file for complete search history.

(56) References Cited

U.S. PATENT DOCUMENTS

2010/0165480 A1   7/2010   Yamaguchi et al.
2012/0268831 A1   10/2012  Yamanashi

FOREIGN PATENT DOCUMENTS

| JP | 2007-232974 | 9/2007 |
| JP | 2010-152148 | 7/2010 |
| JP | 2011-170371 | 9/2011 |

* cited by examiner

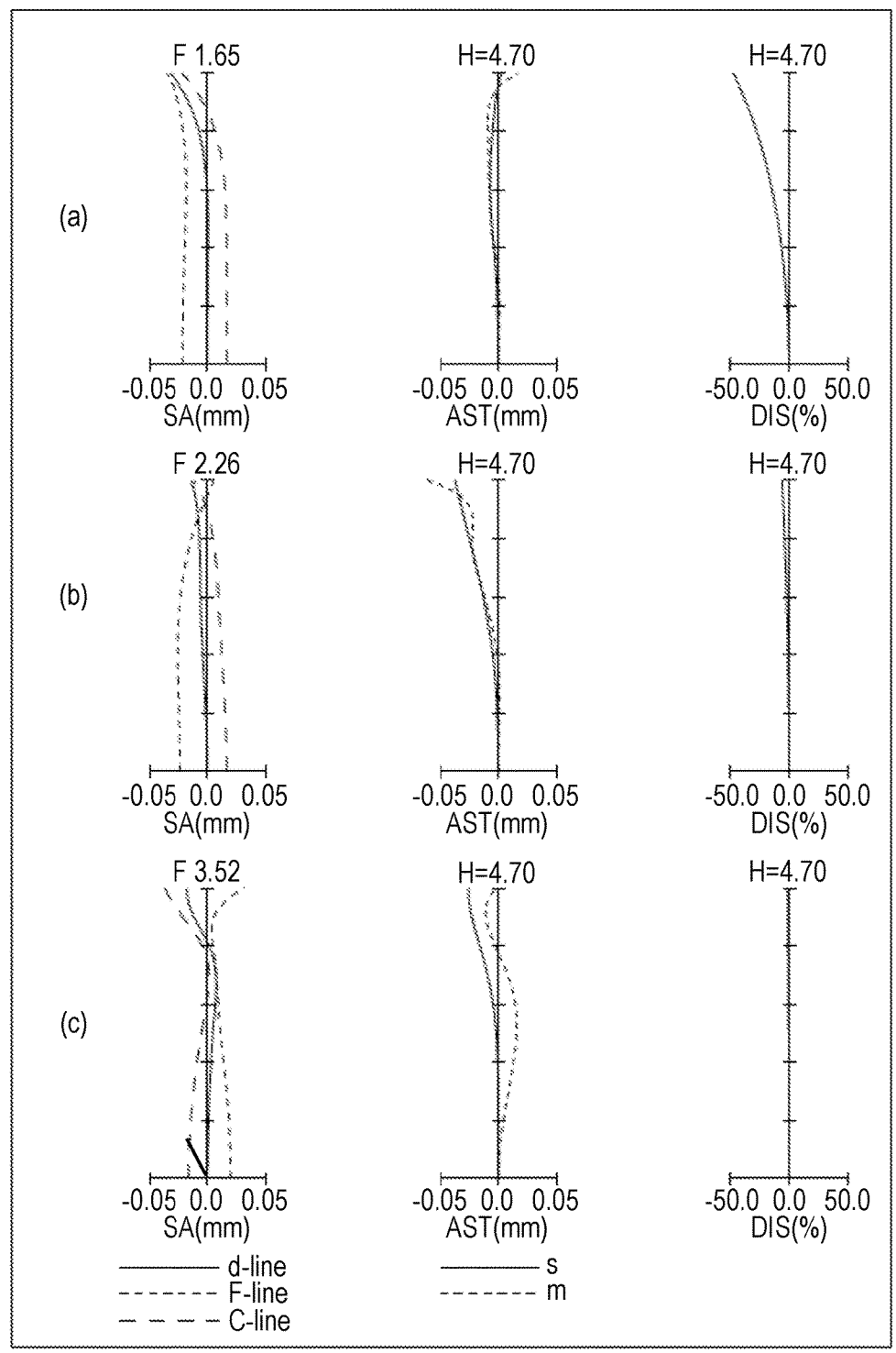

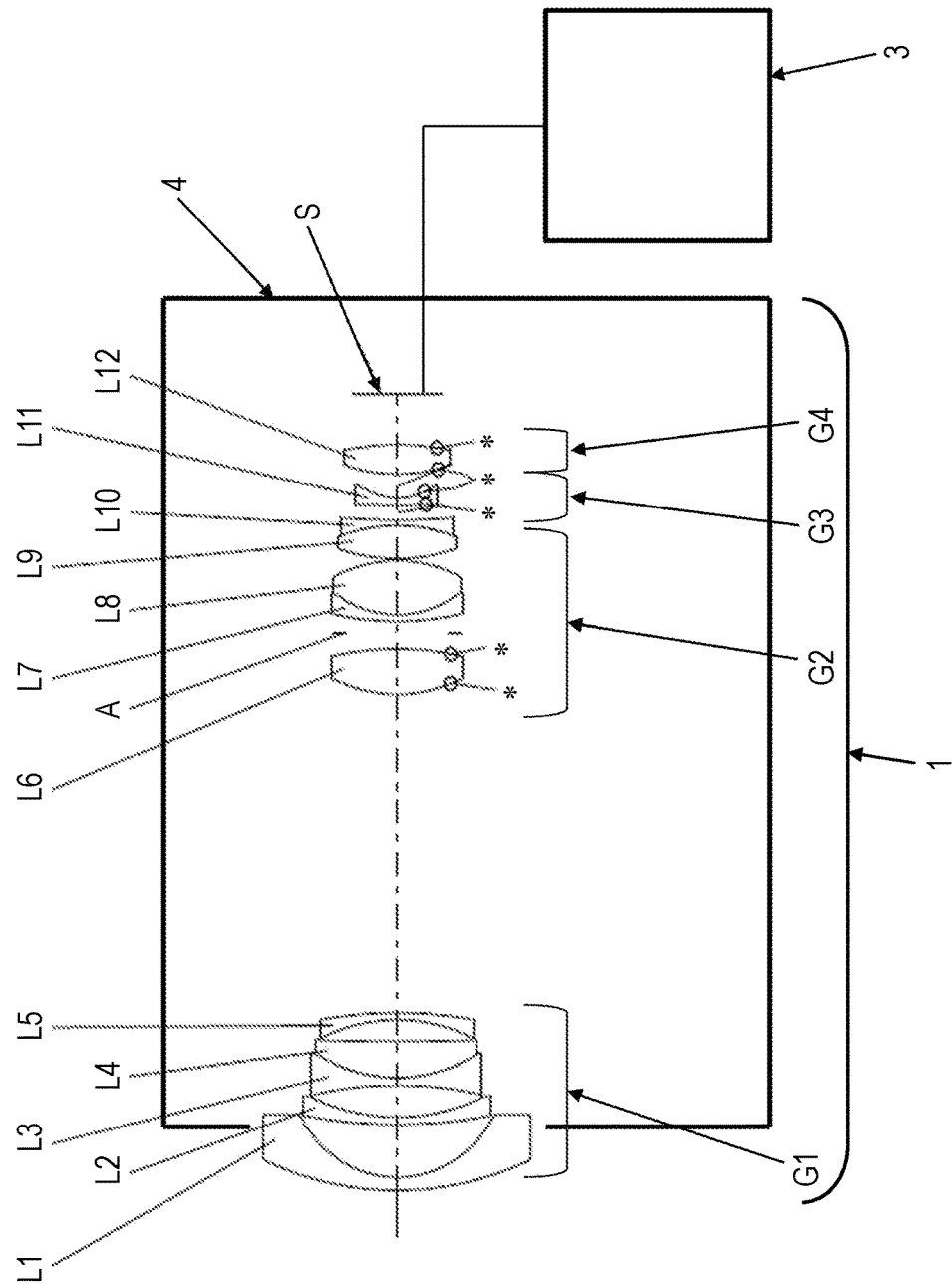

ZOOM LENS SYSTEM, IMAGE CAPTURING DEVICE

BACKGROUND

1. Technical Field

The present disclosure provides a zoom lens that is compact and has a high optical performance and a high zoom ratio in spite of the wide angle and large aperture (small f-number), and an image capturing device using the zoom lens.

2. Description of the Related Art

Patent literature 1 discloses a zoom lens system that, is composed of, in the following order from an object side toward an image side, four lens groups with negative, positive, negative, and positive refractive forces and performs zooming by changing the distances between the lens groups.

CITATION LIST

Patent Literature

PTL 1: Japanese Patent Unexamined Publication No. 2011-170371

SUMMARY

An object of the present disclosure is to provide a zoom lens that is compact and has a high optical performance and a high zoom ratio in spite of the wide angle and large aperture (small f-number), and an image capturing device using the zoom lens.

A zoom lens system having a plurality of lens groups each composed of at least one lens element. The zoom lens system includes, in the following order from an object side toward an image side, a first lens group with negative power, a second lens group with positive power, a third lens group with negative power, and a fourth lens group with positive power. The first lens group includes, in the following order from the object side toward the image side, a first lens element having a negative meniscus shape with a concave surface of the shape facing the image side, a second lens element having a negative meniscus shape with a concave surface of the shape facing the image side, a third lens element with a concave surface of the element facing the image side, a fourth lens element with a convex surface of the element facing the object side, and a fifth lens element with a concave surface of the element facing the object side. The third lens element and the fourth lens element compose a cemented lens.

An image capturing device includes the above-described zoom lens system and an imaging element photoreceiving an image formed by the zoom lens system.

The present disclosure provides a zoom lens that is compact and has a high optical performance and a high zoom ratio in spite of the wide angle and large aperture (small f-number), and an image capturing device using the zoom lens.

BRIEF DESCRIPTION OF DRAWINGS

FIG. 8 is a vertical aberration diagram of the infinity focusing state of the zoom lens system according to the fourth embodiment.

FIG. 9 is an outline block diagram of a network camera using the zoom lens system according to the first embodiment.

DETAILED DESCRIPTION

First Through Fourth Exemplary Embodiments

FIGS. 1, 3, 5, and 7 are lens layout diagrams of zoom lens systems according to the first through fourth embodiments, each illustrating a zoom lens system in the infinity focusing state.

In the figures, part (a) illustrates a lens configuration at the wide-angle end (in a state of the shortest focal length: focal length fw); part (b), a lens configuration at an intermediate position (in a state of an intermediate focal length: focal length fm=√(fw*ft)); and part (c), a lens configuration at the telephoto end (in a state of the longest focal length: focal length ft). Between parts (a) and (b) of each figure, the positions of the lens groups are shown at the wide-angle end, an intermediate position, and the telephoto end in sequence from the top. The positions of the lens groups are connected with zigzag arrows, showing movement of the lens groups from the wide-angle end to the telephoto end. Between the wide-angle end and an intermediate position, and between the intermediate position and telephoto end, are connected simply with straight lines for convenience, which is different from actual movement of the lens groups.

In of the figures, (a) the arrow inscribed in the mark of the lens group shown below the lens configuration at the wide-angle end represents focusing from the infinity focusing state to the proximity focusing state. More specifically, FIGS. 1, 3, 5 and 7 show the direction in which third lens group G3 (described later) moves when focusing from the infinity focusing state to the proximity focusing state. Note that in of FIGS. 1, 3, 5 and 7, (a) the mark of each lens group is inscribed below the lens configuration at the wide-angle end, and thus an arrow for indicating focusing is inscribed in the mark for convenience. The direction in which each lens group moves when focusing in each zooming state is concretely described later for each embodiment.

In FIGS. 1, 3, 5 and 7, an asterisk * inscribed in a specific surface of each lens element indicates the surface is aspheric. In each figure, a symbol (+) and symbol (−) inscribed in the mark of each lens group correspond to the polarity of the power of each lens group. In each figure, the rightmost straight line indicates the position of the image surface of imaging element S.

As shown in FIGS. 1, 3, 5 and 7, aperture stop A is further provided in place.

1. First Exemplary Embodiment (FIG. 1)

Figure 1:
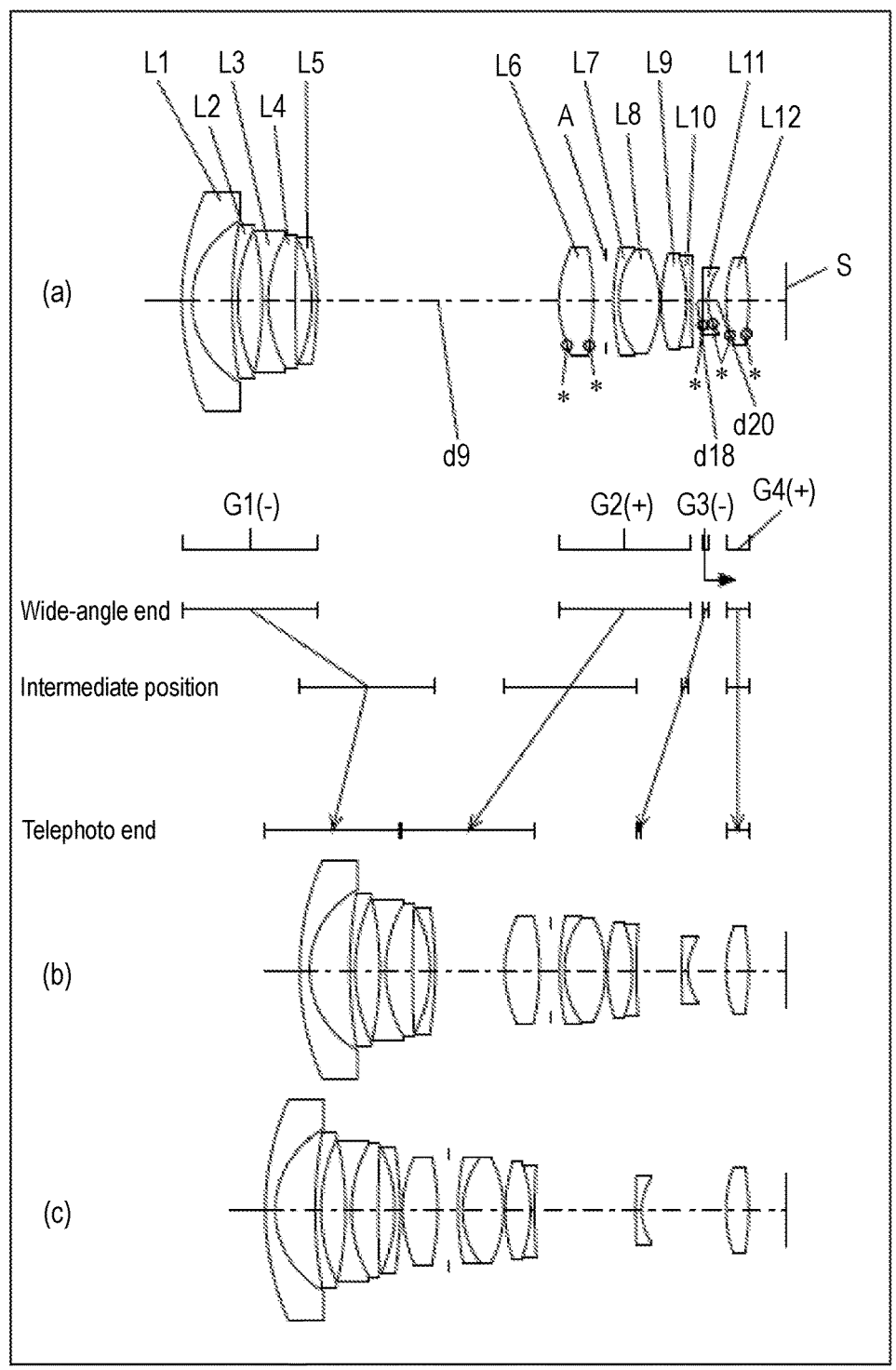
FIG. 1 is a lens layout diagram illustrating the infinity focusing state of a zoom lens system according to the first exemplary embodiment.
Figure 2:
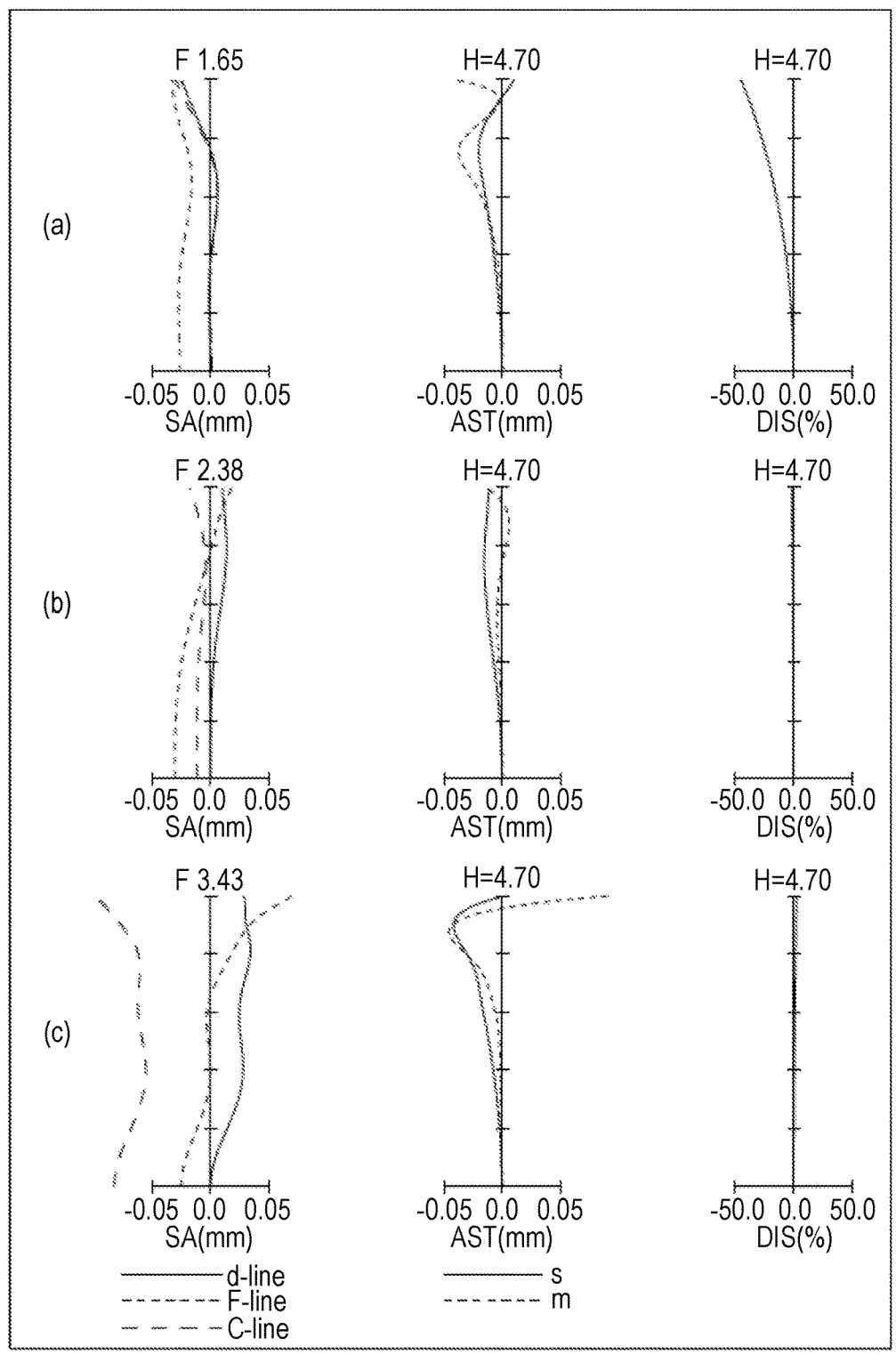
FIG. 2 is a vertical aberration diagram of the infinity focusing state of the zoom lens system according to the first embodiment.

FIG. 1 illustrates the lens arrangement of a zoom lens system according to the first embodiment.

The zoom lens system, is composed of, in the following order from an object side toward an image side, first lens group G1 with negative power, second lens group G2 with positive power, third lens group G3 with negative power, fourth lens group G4 with positive power, and imaging element S.

First lens group G1, is composed of, in the following order from an object side toward an image side, first lens element L1 with negative power, second lens element L2 with negative power, third lens element L3 with negative power, fourth lens element L4 with positive power, and fifth lens element L5 with negative power. Third lens element L3 and fourth lens element L4 are bonded together with a bonding material for example to form a cemented lens.

Second lens group G2, is composed of, in the following order from an object side toward an image side, sixth lens element L6 with positive power, aperture stop A, seventh lens element L7 with negative power, eighth lens element L8 with positive power, ninth lens element L9 with positive power, and tenth lens element L10 with negative power. Seventh lens element L7 and eighth lens element L8 are bonded together with a bonding material for example to form a cemented lens. Ninth lens element L9 and tenth lens element L10 are bonded together with a bonding material for example to form a cemented lens.

Third lens group G3 is composed of eleventh lens element L11, a single lens with negative power.

Fourth lens group G4 is composed of twelfth lens element L12, a single lens with negative power.

A description is made of each lens element.

The lens elements in first lens group G1 are described. First lens element L1 is a meniscus lens having a convex surface facing an object side. Second lens element L2 is a meniscus lens having a convex surface facing an object side. Third lens element L3 is a biconcave lens. Fourth lens element L4 is a meniscus lens having a convex surface facing an object side. Fifth lens element L5 is a meniscus lens having a concave surface facing an object side.

The lens elements in second lens group G2 are described. Sixth lens element L6 is a biconvex lens having aspheric shapes facing an object side and an image side. Seventh lens element L7 is a meniscus lens having a convex shape facing an object side. Eighth lens element L8 is a biconvex lens. Ninth lens element L9 is a biconvex lens. Tenth lens element L10 is a biconcave lens.

The lens element in third lens group G3 is described. Eleventh lens element L11 is a meniscus lens having a convex shape facing an object side and having aspheric shapes facing an object side and an image side.

The lens element in fourth lens group G4 is described. Twelfth lens element L12 is a biconvex lens having aspheric shapes facing an object side and an image side.

In the zoom lens system according to the first embodiment, first lens group G1 moves along a path convex toward an image side, and second lens group G2 and third lens group G3 move toward an object side, when zooming from the wide-angle end to the telephoto end during photographing. That is, each lens group moves along the optical axis in zooming so as to decrease the distance between first lens group G1 and second lens group G2 and to increase the distance between second lens group G2 and third lens group G3 and the distance between third lens group G3 and fourth lens group G4.

In the zoom lens system according to the first embodiment, third lens group G3 moves to an image side along the optical axis when focusing from the infinity focusing state to the proximity focusing state.

2. Second Exemplary Embodiment (FIG. 3)

Figure 3:
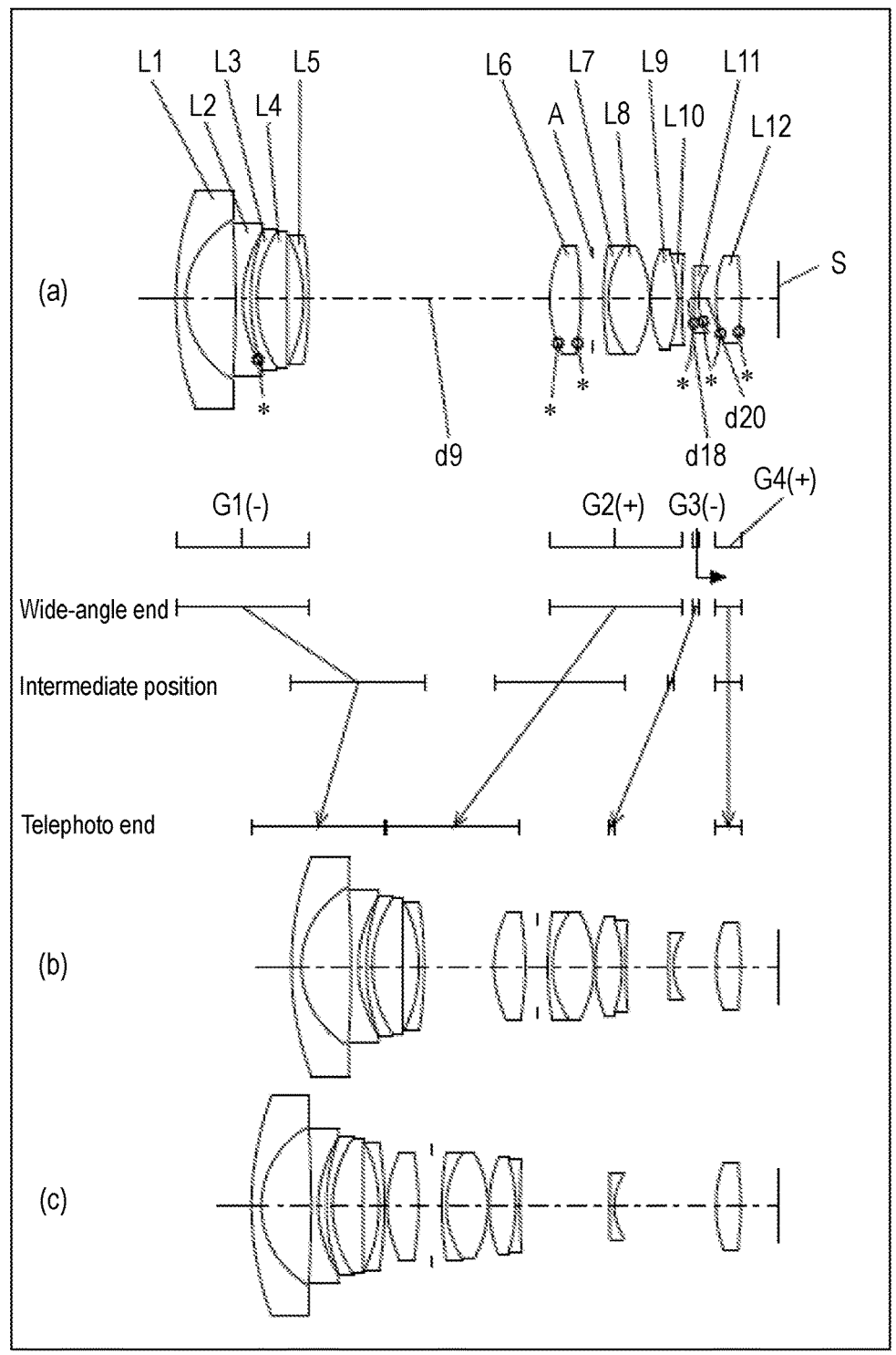
FIG. 3 is a lens layout diagram illustrating the infinity focusing state of a zoom lens system according to the second exemplary embodiment.
Figure 4:
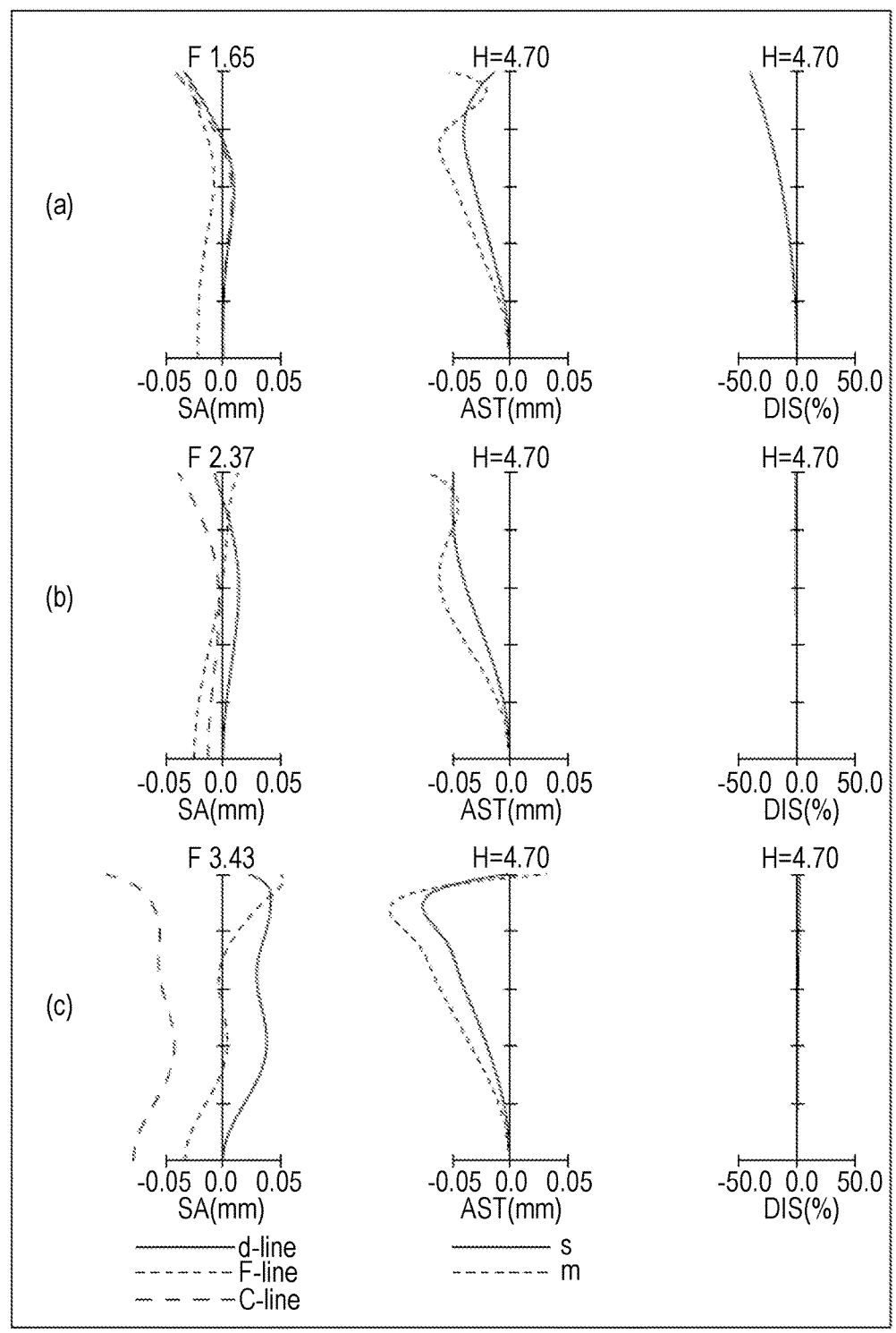
FIG. 4 is a vertical aberration diagram of the infinity focusing state of the zoom lens system according to the second embodiment.

FIG. 3 illustrates the lens arrangement of a zoom lens system according to the second embodiment.

The zoom lens system is composed of, in the following order from an object toward an image side, first lens group G1 with negative power, second lens group G2 with positive power, third lens group G3 with negative power, fourth lens group G4 with positive power, and imaging element S.

First lens group G1, is composed of, in the following order from an object side toward an image side, first lens element L1 with negative power, second lens element L2 with negative power, third lens element L3 with negative power, fourth lens element L4 with positive power, and fifth lens element L5 with negative power. Third lens element L3 and fourth lens element L4 are bonded together with a bonding material for example to form a cemented lens.

Second lens group G2, is composed of, in the following order from an object side toward an image side, sixth lens element L6 with positive power, aperture stop A, seventh lens element L7 with negative power, eighth lens element L8 with positive power, ninth lens element L9 with positive power, and tenth lens element L10 with negative power. Seventh lens element L7 and eighth lens element L8 are bonded together with a bonding material for example to form a cemented lens.

Third lens group G3 is composed of eleventh lens element L11, a single lens with negative power.

Fourth lens group G4 is composed of twelfth lens element L12, a single lens with negative power.

A description is made of each lens element.

The lens elements in first lens group G1 are described. First lens element L1 is a meniscus lens having a convex surface facing an object side. Second lens element L2 is a biconvex lens having an aspheric shape facing an image side. Third lens element L3 is a meniscus lens having a convex surface facing an object side. Fourth lens element L4 is a meniscus lens having a convex surface facing an object side. Fifth lens element L5 is a meniscus lens having a concave surface facing an object side.

The lens elements in second lens group G2 are described. Sixth lens element L6 is a biconvex lens having aspheric shapes facing an object side and an image side. Seventh lens element L7 is a meniscus lens having a convex shape facing an object side. Eighth lens element L8 is a biconvex lens. Ninth lens element L9 is a biconvex lens. Tenth lens element L10 is a biconcave lens.

The lens element in third lens group G3 is described. Eleventh lens element L11 is a meniscus lens having a convex shape facing an object side and having aspheric shapes facing an object side and an image side.

The lens element in fourth lens group G4 is described. Twelfth lens element L12 is a biconvex lens having aspheric shapes facing an object side and an image side.

In the zoom lens system according to the second embodiment, first lens group G1 moves along a path convex toward an image side, and second lens group G2 and third lens group G3 move toward an object side, when zooming from the wide-angle end to the telephoto end during photographing. That is, each lens group moves along the optical axis in zooming so as to decrease the distance between first lens group G1 and second lens group G2 and to increase the distance between second lens group G2 and third lens group G3 and the distance between third lens group G3 and fourth lens group G4.

In the zoom lens system according to the second embodiment, third lens group G3 moves to an image side along the optical axis when focusing from the infinity focusing state to the proximity focusing state.

3. Third Exemplary Embodiment (FIG. 5)

Figure 5:
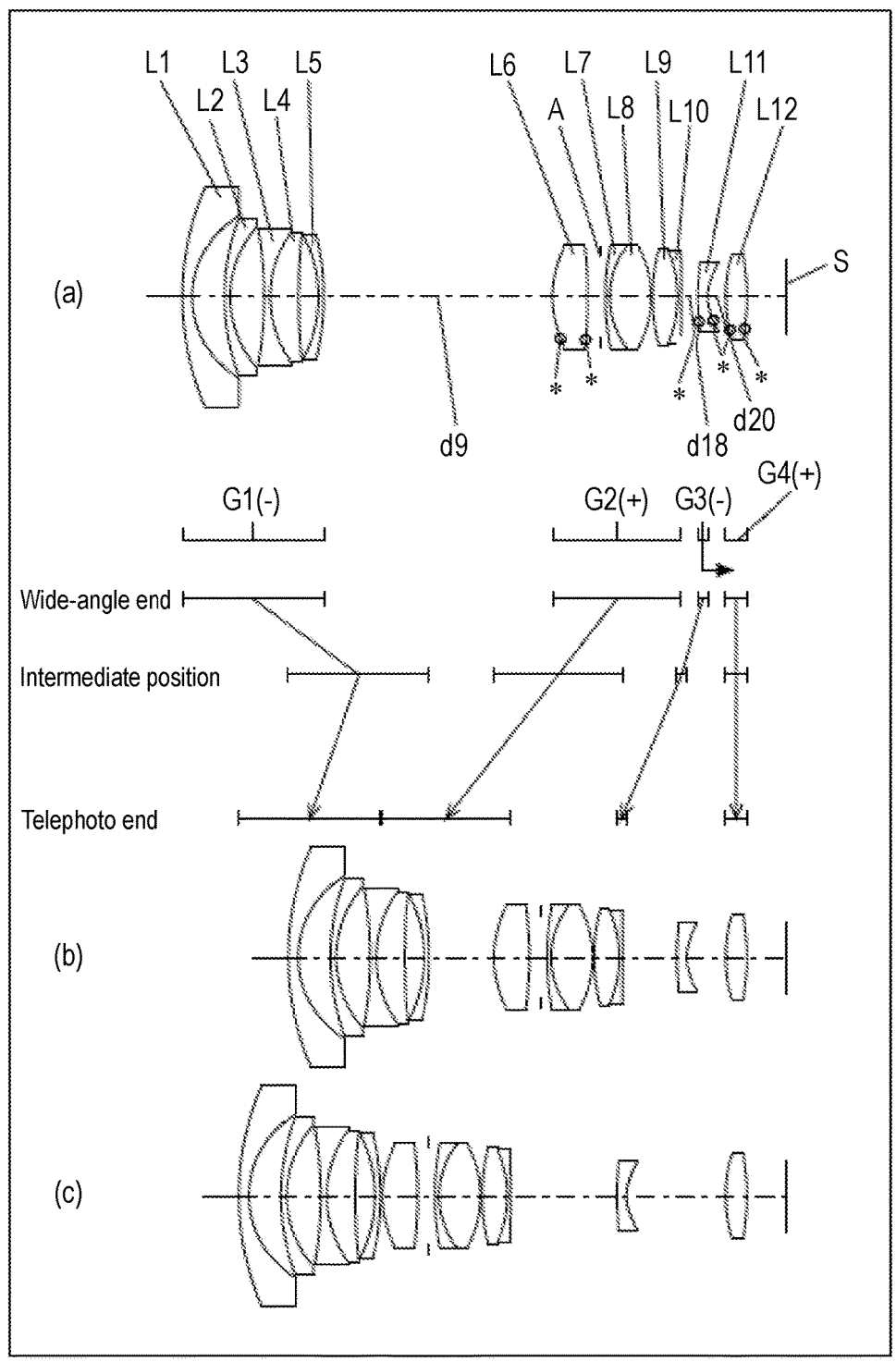
FIG. 5 is a lens layout diagram illustrating the infinity focusing state of a zoom lens system according to the third exemplary embodiment.
Figure 6:
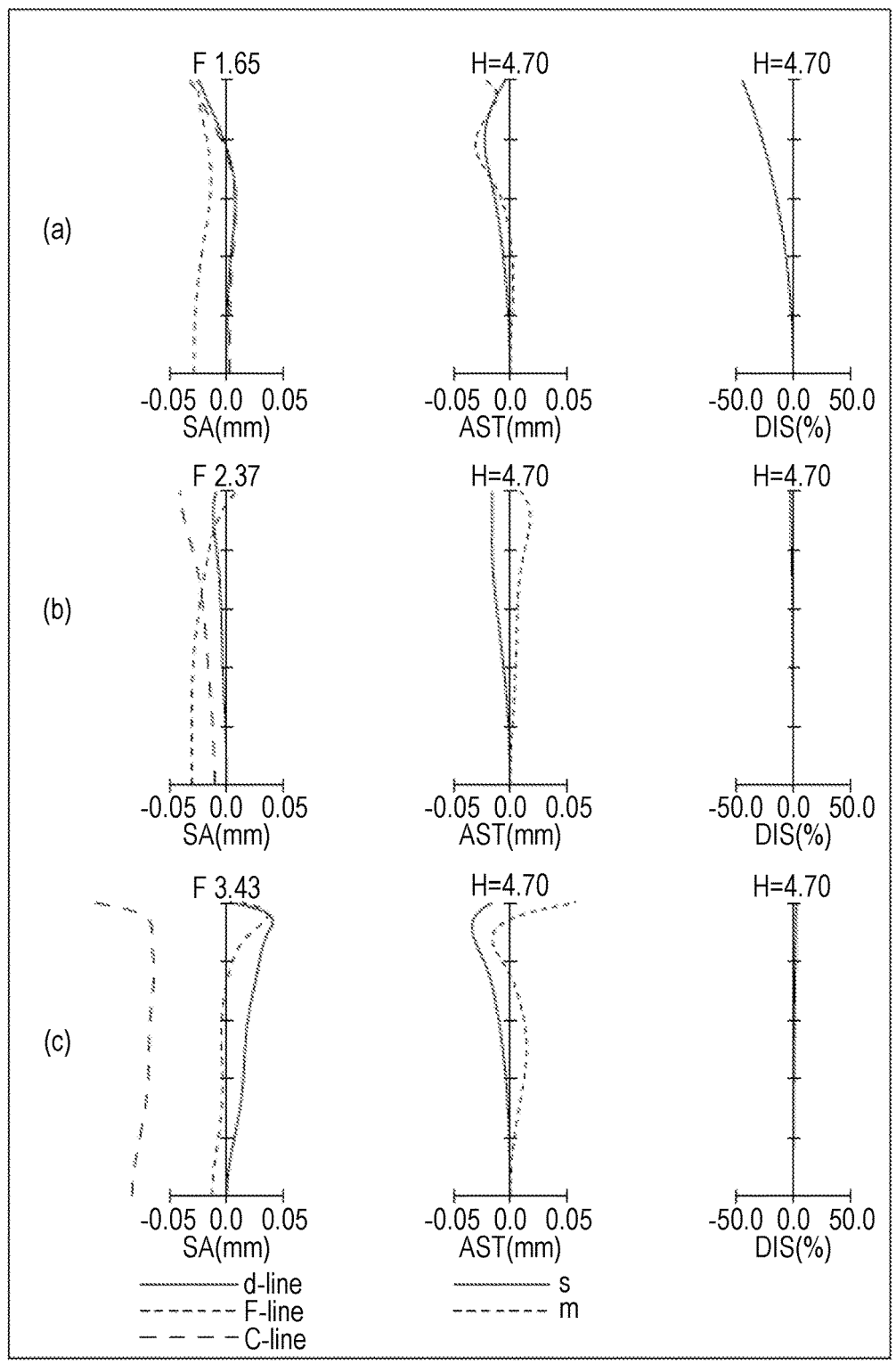
FIG. 6 is a vertical aberration diagram of the infinity focusing state of the zoom lens system according to the third embodiment.

FIG. 5 illustrates the lens arrangement of a zoom lens system according to the third embodiment.

The zoom lens system is composed of, in the following order from an object side toward an image side, first lens group G1 with negative power, second lens group G2 with positive power, third lens group G3 with negative power, fourth lens group G4 with positive power, and imaging element S.

First lens group G1, is composed of, in the following order from an object side toward an image side, first lens element L1 with negative power, second lens element L2 with negative power, third lens element L3 with negative power, fourth lens element L4 with positive power, and fifth lens element L5 with negative power. Third lens element L3 and fourth lens element L4 are bonded together with a bonding material for example to form a cemented lens.

Second lens group G2, is composed of, in the following order from an object side toward an image side, sixth lens element L6 with positive power, aperture stop A, seventh lens element L7 with negative power, eighth lens element L8 with positive power, ninth lens element L9 with positive power, and tenth lens element L10 with negative power. Seventh lens element L7 and eighth lens element L8 are bonded together with a bonding material for example to form a cemented lens. Ninth lens element L9 and tenth lens element L10 are bonded together with a bonding material for example to form a cemented lens.

Third lens group G3 is composed of eleventh lens element L11, a single lens with negative power.

Fourth lens group G4 is composed of twelfth lens element L12, a single lens with negative power.

A description is made of each lens element.

The lens elements in first lens group G1 are described. First lens element L1 is a meniscus lens having a convex surface facing an object side. Second lens element L2 is a meniscus lens having a convex surface facing an object side. Third lens element L3 is a biconcave lens. Fourth lens element L4 is a meniscus lens having a convex surface facing an object side. Fifth lens element L5 is a meniscus lens having a concave surface facing an object side.

The lens elements in second lens group G2 are described. Sixth lens element L6 is a biconvex lens having aspheric shapes facing an object side and an image side. Seventh lens element L7 is a meniscus lens having a convex shape facing an object side. Eighth lens element L8 is a biconvex lens. Ninth lens element L9 is a biconvex lens. Tenth lens element L10 is a meniscus lens having a concave surface facing an object side.

The lens element in third lens group G3 is described. Eleventh lens element L11 is a meniscus lens having a convex shape facing an object side and having aspheric shapes facing an object side and an image side.

The lens element in fourth lens group G4 is described. Twelfth lens element L12 is a biconvex lens having aspheric shapes facing an object side and an image side.

In the zoom lens system according to the third embodiment, first lens group G1 moves along a path convex toward an image side, and second lens group G2 and third lens group G3 move toward an object side, when zooming from the wide-angle end to the telephoto end during photographing. That is, each lens group moves along the optical axis in zooming so as to decrease the distance between first lens group G1 and second lens group G2 and to increase the distance between second lens group G2 and third lens group G3 and the distance between third lens group G3 and fourth lens group G4.

In the zoom lens system according to the third embodiment, third lens group G3 moves to an image side along the optical axis when focusing from the infinity focusing state to the proximity focusing state.

4. Fourth Exemplary Embodiment (FIG. 7)

Figure 7:
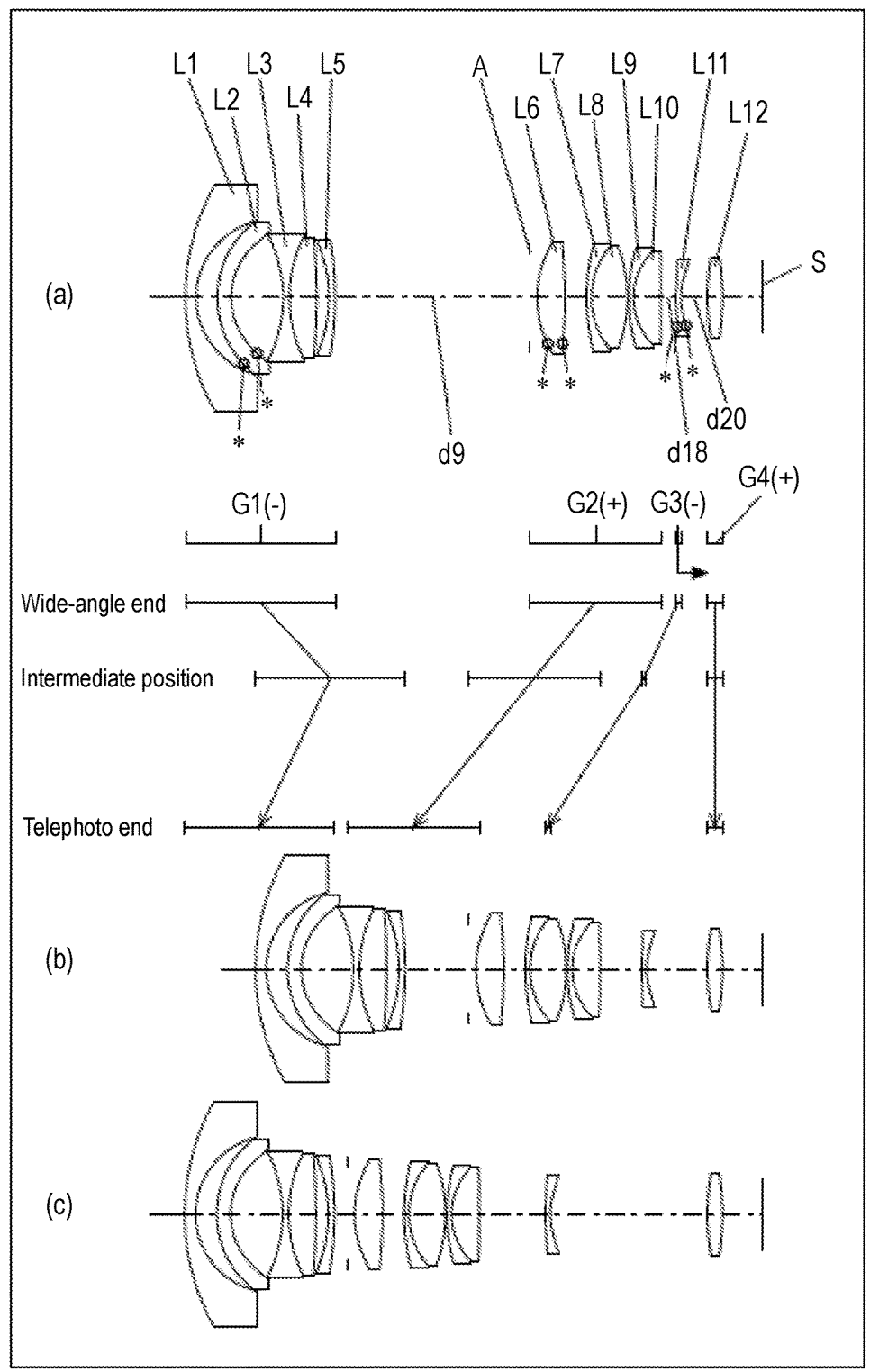
FIG. 7 is a lens layout diagram illustrating the infinity focusing state of a zoom lens system according to the fourth exemplary embodiment.

FIG. 7 illustrates the lens arrangement of a zoom lens system according to the fourth embodiment.

The zoom lens system, is composed of, in the following order from an object side toward an image side, first lens group G1 with negative power, second lens group G2 with positive power, third lens group G3 with negative power, fourth lens group G4 with positive power, and imaging element S.

First lens group G1, is composed of, in the following order from an object side toward an image side, first lens element L1 with negative power, second lens element L2 with negative power, third lens element L3 with negative power, fourth lens element L4 with positive power, and fifth lens element L5 with negative power. Third lens element L3 and fourth lens element L4 are bonded together with a bonding material for example to form a cemented lens.

Second lens group G2, is composed of, in the following order from an object side toward an image side, aperture stop A, sixth lens element L6 with positive power, seventh lens element L7 with negative power, eighth lens element L8 with positive power, ninth lens element L9 with negative power, and tenth lens element L10 with positive power. Seventh lens element L7 and eighth lens element L8 are bonded together with a bonding material for example to form a cemented lens. Ninth lens element L9 and tenth lens element L10 are bonded together with a bonding material for example to form a cemented lens.

Third lens group G3 is composed of eleventh lens element L11, a single lens with negative power.

Fourth lens group G4 is composed of twelfth lens element L12, a single lens with negative power.

A description is made of each lens element.

The lens elements in first lens group G1 are described. First lens element L1 is a meniscus lens having a convex surface facing an object side. Second lens element L2 is a meniscus lens having a convex surface facing an object side and having aspheric shapes facing an object side and an image side. Third lens element L3 is a biconcave lens. Fourth lens element L4 is a biconvex lens. Fifth lens element L5 is a meniscus lens having a concave surface facing an object side.

The lens elements in second lens group G2 are described. Sixth lens element L6 is a biconvex lens having aspheric shapes facing an object side and an image side. Seventh lens element L7 is a meniscus lens having a convex shape facing an object side. Eighth lens element L8 is a biconvex lens.

Ninth lens element L9 is a meniscus lens having a concave surface facing an object side. Tenth lens element L10 is a biconvex lens.

The lens element in third lens group G3 is described. Eleventh lens element L11 is a meniscus lens having a convex shape facing an object side and having aspheric shapes facing an object side and an image side.

The lens element in fourth lens group G4 is described. Twelfth lens element L12 is a biconvex lens.

In the zoom lens system according to the fourth embodiment, first lens group G1 moves along a path convex toward an image side, and second lens group G2 and third lens group G3 move toward an object side, when zooming from the wide-angle end to the telephoto end during photographing. That is, each lens group moves along the optical axis in zooming so as to decrease the distance between first lens group G1 and second lens group G2 and to increase the distance between second lens group G2 and third lens group G3 and the distance between third lens group G3 and fourth lens group G4.

In the zoom lens system according to the fourth embodiment, third lens group G3 moves to an image side along the optical axis when focusing from the infinity focusing state to the proximity focusing state.

5. Other Exemplary Embodiments

Hereinbefore, the first through fourth embodiments are described to exemplify the technology disclosed in this patent application. The technology of the disclosure, however, is not limited to these embodiments, but is applicable to other embodiments appropriately devised through modification, substitution, addition, and omission for example.

6. Conditional Expressions and Advantages

Hereinafter, a description is made of conditions that can be satisfied by a zoom lens system according to the first through fourth embodiments for example. Here, some possible conditions are defined for a zoom lens system according to the first through fourth embodiments, and a zoom lens system that satisfies all the conditions is most effective. However, by satisfying an individual condition, a zoom lens system that provides a corresponding advantage can be achieved as well.

A zoom lens system according to the first through fourth embodiments includes, in the following order from an object side toward an image side, first lens group G1 with negative power, second lens group G2 with positive power, third lens group G3 with negative power, fourth lens group G4 with positive power, and imaging element S. First lens group G1 includes at least one cemented lens, and the lens element closest to an image side, of the first lens group G1 has a concave shape facing an object side. Such a configuration provides a zoom lens system with a high optical performance in spite of the wide angle and small f-number.

In a zoom lens system according to the first through fourth embodiments when zooming, at least first lens group G1 through third lens group G3 move along the optical axis.

It is desirable that the zoom lens system further satisfies following conditional expressions (1) and (2) for example.

$$8.0 \leq Lw/\{fw \times \tan(\omega w)\} \leq 15 \tag{1}$$

$$ft/fw \geq 4.5 \tag{2}$$

where
Lw: the total optical length at the wide-angle end
ωw: the half view angle (°) at the wide-angle end
fw: the focal length of the entire system at the wide-angle end
ft: the focal length of the entire system at the telephoto end Conditional expression (1) defines the size of a lens barrel. If the value of conditional expression (1) falls below the lower limit, the length of the lens barrel at the wide-angle end can be shortened. However, the value is to fall below the minimum length of the lens barrel required for favorable optical performance when photographing, which may make it difficult to correct various aberrations (e.g., curvature of field, distortion aberration). If the value of conditional expression (1) exceeds the upper limit, the length of the lens barrel becomes longer than necessary for favorable optical performance, which may make it difficult to provide a compact lens barrel, image capturing device, and camera. Conditional expression (2) defines the ratio of the focal length of the entire system at the wide-angle end to that at the telephoto end. A zoom lens system with a basic configuration that satisfies conditional expression (2) has a relatively high zoom ratio to provide a middle or high magnification.

Further satisfying at least one of conditional expressions (1A), (1B), and (2A) below enhances the above-described advantage.

$$9 \leq Lw/\{fw \times \tan(\omega w)\} \tag{1A}$$

$$Lw/\{fw \times \tan(\omega w)\} \leq 12 \tag{1B}$$

$$ft/fw \geq 4.7 \tag{2A}$$

It is desirable that the zoom lens system further satisfies following conditional expression (3) for example.

$$-4.0 \leq (R1+R2)/(R1-R2) \leq -1.1 \tag{3}$$

where
R1: the object-side curvature radius of the lens element closest to an image side in the first lens group
R2: the image-side curvature radius of the lens element closest to an image side in the first lens group Conditional expression (3) defines the shape of the lens element closest to an image side in the first lens group. Being out of the range of conditional expression (3) makes it difficult to correct various aberrations, especially curvature of field and distortion aberration, at the wide-angle end.

Further satisfying at least one of conditional expressions (3A) and (3B) below enhances the above-described advantage.

$$-3.2 \leq (R1+R2)/(R1-R2) \tag{3A}$$

$$(R1+R2)/(R1-R2) \leq -2.5 \tag{3B}$$

It is desirable that the zoom lens system further satisfies following conditional expression (4) for example.

$$50 \leq \omega w \leq 70 \tag{4}$$

where
ωw: a half view angle (°) at the wide-angle end
Conditional expression (4) defines a half view angle at the wide-angle end. A zoom lens system with a basic configuration that satisfies conditional expression (4) achieves a wider angle while maintaining a required level of optical performance.

Further satisfying at least one of conditional expressions (4A) and (4B) below enhances the above-described advantage.

$$60 \leq \omega w \quad (4A)$$

$$\omega w \leq 65 \quad (4B)$$

It is desirable that the zoom lens system further satisfies following conditional expression (5) for example.

$$-3.5 \leq f1/fw \leq -2.0 \quad (5)$$

where
f1: the focal length of the first lens group
fw: the focal length of the entire system at the wide-angle end Conditional expression (5) defines the ratio of the focal length of the first lens group to that of the entire system at the wide-angle end. If the value of conditional expression (5) falls below the lower limit, the power of the first lens group decreases to make it difficult to achieve a wider angle. If the value of conditional expression (5) exceeds the upper limit, it becomes difficult to correct various aberrations, especially curvature of field and distortion aberration.

Further satisfying at least one of conditional expressions (5A) and (5B) below enhances the above-described advantage.

$$-2.6 \leq f1/fw \quad (5A)$$

$$f1/fw \leq -2.1 \quad (5B)$$

It is desirable that the zoom lens system further satisfies following conditional expression (6) for example.

$$vd1n \geq 60 \quad (6)$$

where
vd1n: an Abbe number of the element with negative power of two pieces of lenses composing a cemented lens Conditional expression (6) defines an Abbe number of a lens with negative power composing a cemented lens in the first lens group. If the value of conditional expression (6) falls below the lower limit, it becomes difficult to favorably correct color aberration from the wide-angle end to the telephoto end.

Further satisfying conditional expression (6A) below enhances the above-described advantage.

$$vd1n \geq 62 \quad (6A)$$

It is desirable that the zoom lens system further satisfies following conditional expression (7) for example.

$$2.8 \leq f2/fw \leq 4.0 \quad (7)$$

where
f2: the focal length of the second lens group
fw: the focal length of the entire system at the wide-angle end Conditional expression (7) defines the ratio of the focal length of the second lens group to that of the entire system at the wide-angle end. If the value of conditional expression (7) falls below the lower limit, the power of the second lens group increases, which makes it difficult to correct various aberrations, especially spherical aberration and axial chromatic aberration, at the telephoto end. If the value of conditional expression (7) exceeds the upper limit, the second lens group moves longer to extend the total optical length, which makes it difficult to provide a compact lens barrel.

Further satisfying conditional expressions (7A) and (7B) below enhances the above-described advantage.

$$3.0 \leq f2/fw \quad (7A)$$

$$f2/fw \leq 3.7 \quad (7B)$$

It is desirable that the zoom lens system further satisfies following conditional expression (8) for example.

$$vd2p \geq 65 \quad (8)$$

where
vd2p: the average value of the Abbe numbers of the lens elements with positive power in the second lens group Conditional expression (8) defines the average value of the Abbe numbers of the lens elements with positive power in the second lens group. If the value of conditional expression (8) falls below the lower limit, it becomes difficult to correct various aberrations, especially axial chromatic aberration, at the telephoto end.

Further satisfying conditional expression (8A) below enhances the above-described advantage.

$$vd2p \geq 69 \quad (8A)$$

It is desirable that the zoom lens system further satisfies following conditional expression (9) for example.

$$-6.0 \leq f3/fw \leq -2.0 \quad (9)$$

where
f3: the focal length of the third lens group
fw: the focal length of the entire system at the wide-angle end Conditional expression (9) defines the ratio of the focal length of the third lens group to that of the entire system at the wide-angle end. If the value of conditional expression (9) falls below the lower limit, the third lens group moves longer to extend the total optical length, which makes it difficult to provide a compact lens barrel. If the value of conditional expression (9) exceeds the upper limit, the power of the third lens group increases, which makes it difficult to reduce fluctuation of the image surface from a long distance to a short distance during focusing.

Further satisfying at least one of conditional expressions (9A) and (9B) below enhances the above-described advantage.

$$-5.1 \leq f3/fw \quad (9A)$$

$$f3/fw \leq -2.9 \quad (9B)$$

Finally, it is desirable that the zoom lens system satisfies following conditional expression (10) for example.

$$3.0 \leq f4/fw \leq 5.3 \quad (10)$$

where
f4: the focal length of the fourth lens group
fw: the focal length of the entire system at the wide-angle end Conditional expression (10) defines the ratio of the focal length of the fourth lens group to that of the entire system at the wide-angle end. If the value of conditional expression (10) falls below the lower limit, the power of the fourth lens group increases, which makes it difficult to reduce various aberrations, especially curvature of field. If the value of conditional expression (10) exceeds the upper limit, the angle in which light enters the image surface increases, which makes it difficult to reduce color shading.

Further satisfying at least one of conditional expressions (10A) and (10B) below enhances the above-described advantage.

$$3.3 \leq f4/fw \quad (10A)$$

$$f4/fw \leq 5.0 \quad (10B)$$

An Outline Structure of a Digital Camera to which the First Embodiment is Applied FIG. 9 is an outline block diagram of a network camera to which a zoom lens system according to the first embodiment is applied. Note that a zoom lens system according to the second through fourth embodiments can be applied.

As shown in FIG. 9, the network camera, is composed of case 4, imaging element S, zoom lens system 1, and communication unit 3.

Zoom lens system 1 is provided with an actuator and a lens frame so that all the lens groups (first lens group G1 through fourth lens group G4) move along the optical axis when zooming, in the same way as in the first embodiment.

The network camera is capable of transmitting an object image formed in imaging element S by zoom lens system 1 through communication unit 3.

The example is shown where a zoom lens system according to the first embodiment described hereinbefore is applied to a network camera; the zoom lens system can be applied to a digital camera, smartphone, and lens-interchangeable camera for example.

NUMERICAL PRACTICAL EXAMPLES

Hereinafter, a description is made of numerical practical examples 1 through 4 that embody zoom lens systems according to the first through fourth embodiments. The practical examples represent each length in tables in the unit of mm; each view angle in the unit of °(degree). In the practical examples, r is a curvature radius; d, a surface distance; nd, a refractive index for d-line; and vd, an Abbe number for d-line. In the practical examples, a surface with a * mark is aspheric and its shape is defined by the following expression.

$$Z = \frac{h^2/r}{1 + \sqrt{1-(1+\kappa)(h/r)^2}} + \sum A_n h^n$$ [Numerical formula 1]

where
Z: the distance from a point on an aspheric surface (the height from the optical axis is h) to the tangent plane at the apex of the aspheric surface
h: the height from the optical axis
r: the curvature radius at the apex
κ: a conic constant
An: an n-degree aspherical coefficient FIGS. 2, 4, 6, and 8 are longitudinal aberration diagrams of zoom lens systems according to the first through fourth embodiments, in the infinity focusing state.

In each longitudinal aberration diagram, part (a) shows aberration at the wide-angle end; part (b), at an intermediate position; and part (c), at the telephoto end. Each longitudinal aberration diagram shows spherical aberration (SA (mm)), astigmatism (AST (mm)), and distortion aberration (DIS (%)), in this sequence from the left. In a spherical aberration diagram, the vertical axis represents F number (shown by F in the figure). A solid line represents the characteristics of d-line; a short broken line, of F-line; and a long broken line, of C-line. In an astigmatism diagram, the vertical axis represents the image height (shown by H in the diagram). A solid line represents the characteristics of the sagittal plane (shown by s in the diagram); and a broken line, of the meridional plane (shown by m in the diagram). In a distortion aberration diagram, the vertical axis represents the image height (shown by H in the diagram).

Numerical Practical Example 1

The zoom lens system of numerical practical example 1 corresponds to the first embodiment shown in FIG. 1. Table 1 shows surface data of the zoom lens system of numerical practical example 1; table 2, aspheric data; and tables 3A through 3D, various types of data in the infinity focusing state.

TABLE 1

(Surface Data)

| Surface No. | r | d | nd | vd |
|---|---|---|---|---|
| Object surface | ∞ | | | |
| 1 | 38.68270 | 1.40000 | 1.77250 | 49.6 |
| 2 | 13.00340 | 5.68540 | | |
| 3 | 61.53750 | 0.80000 | 1.83481 | 42.7 |
| 4 | 24.36090 | 3.45860 | | |
| 5 | −45.75780 | 0.85000 | 1.48749 | 70.4 |
| 6 | 18.91260 | 3.82830 | 1.92286 | 20.9 |
| 7 | 246.30470 | 2.34030 | | |
| 8 | −20.93430 | 0.75000 | 1.83481 | 42.7 |
| 9 | −53.84080 | variable | | |
| 10* | 15.75960 | 4.90810 | 1.55352 | 71.4 |
| 11* | −32.10230 | 1.72750 | | |
| 12(aperture) | ∞ | 1.14230 | | |
| 13 | 36.17280 | 0.70000 | 1.83400 | 37.3 |
| 14 | 12.62310 | 5.80930 | 1.49700 | 81.6 |
| 15 | −16.50870 | 0.20000 | | |
| 16 | 22.04940 | 3.58070 | 1.59282 | 68.6 |
| 17 | −20.01670 | 0.60000 | 1.83400 | 37.3 |
| 18 | 99.46930 | variable | | |
| 19* | 49.06840 | 0.80940 | 1.68400 | 31.3 |
| 20* | 7.12210 | variable | | |
| 21* | 22.40460 | 3.18220 | 1.81607 | 24.1 |
| 22* | −24.61440 | BF | | |
| Image surface | ∞ | | | |

TABLE 2

(Aspheric Surface Data)

Tenth surface

κ = 0.00000E+00, A4 = −5.54358E−05, A6 = −6.35007E−07,
A8 = 1.51138E−08, A10 = −2.12751E−10, A12 = 0.00000E+00
Eleventh surface κ = 0.00000E+00, A4 = 6.10526E−05, A6 = −6.65229E−07,
A8 = 1.47030E−08, A10 = −2.05051E−10, A12 = 0.00000E+00
Nineteenth surface κ = 0.00000E+00, A4 = −1.05107E−03, A6 = 6.25946E−05,
A8 = −2.24934E−06, A10 = 3.69404E−08, A12 = 0.00000E+00
Twentieth surface κ = 0.00000E+00, A4 = −1.25506E−03, A6 = 6.71008E−05,
A8 = −2.70719E−06, A10 = 4.54076E−08, A12 = 1.00120E−10
Twenty first surface κ = 0.00000E+00, A4 = 7.90937E−05, A6 = −8.10335E−07,
A8 = 1.05011E−07, A10 = −1.19840E−09, A12 = 0.00000E+00
Twenty second surface κ = 0.00000E+00, A4 = 1.46056E−04, A6 = −1.94840E−06,
A8 = 1.33941E−07, A10 = −1.46093E−09, A12 = 0.00000E+00

TABLE 3A (Various Data in Infinity Focusing State)

|  | Wide-angle end | Intermediate position | Telephoto end |
|---|---|---|---|
| Focal length | 4.2988 | 10.5259 | 24.4754 |
| Zoom ratio | 1 | 2.44857 | 5.69354 |
| F number | 1.64736 | 2.37791 | 3.42659 |
| View angle | 63.4001 | 24.3534 | 10.6194 |
| Image height | 4.7000 | 4.7000 | 4.7000 |
| Total lens length | 85.5677 | 68.9076 | 73.7794 |
| BF |  | 5.42873 |  |
| d9 | 34.1722 | 9.8509 | 0.3000 |
| d18 | 1.6117 | 6.4025 | 14.3322 |
| d20 | 2.5830 | 5.4532 | 11.9459 |
| Entrance pupil position | 14.3322 | 12.9147 | 11.6129 |
| Exit pupil position | −24.8710 | −116.0040 | 50.5782 |
| Front principal point | 18.0210 | 22.5282 | 49.3563 |
| Rear principal point | 81.2690 | 58.3818 | 49.3040 |

TABLE 3B

Data of Single Lens

| Lens elements | First surface | Focal length |
|---|---|---|
| 1 | 1 | −25.9738 |
| 2 | 3 | −48.7808 |
| 3 | 5 | −27.3325 |
| 4 | 6 | 22.0200 |
| 5 | 8 | −41.4599 |
| 6 | 10 | 19.8209 |
| 7 | 13 | −23.5671 |
| 8 | 14 | 15.4137 |
| 9 | 16 | 18.2773 |
| 10 | 17 | −19.9346 |
| 11 | 19 | −12.2766 |
| 12 | 21 | 14.8231 |

TABLE 3C

Data of Zoom Lens Groups

| Lens group | First surface | Focal length | Lens configuration length | Front principal point | Rear principal point |
|---|---|---|---|---|---|
| 1 | 1 | −10.96289 | 19.11260 | 5.40039 | 11.05249 |
| 2 | 10 | 13.97766 | 18.66790 | 5.17239 | 9.12512 |
| 3 | 19 | −12.27658 | 0.80940 | 0.56669 | 0.89165 |
| 4 | 21 | 14.82308 | 3.18220 | 0.86114 | 2.23613 |

TABLE 3D

Magnification of Zoom Lens Groups

| Lens groups | First surface | Wide-angle end | Intermediate position | Telephoto end |
|---|---|---|---|---|
| 1 | 1 | 0.00000 | 0.00000 | 0.00000 |
| 2 | 10 | −0.31488 | −0.69649 | −1.32896 |
| 3 | 19 | 2.18493 | 2.41878 | 2.94771 |
| 4 | 21 | 0.56994 | 0.56993 | 0.56991 |

Numerical Practical Example 2

The zoom lens system of numerical practical example 2 corresponds to the second embodiment shown in FIG. 3. Table 4 shows surface data of the zoom lens system of numerical practical example 2; table 5, aspheric data; and tables 6A through 6D, various types of data in the infinity focusing state.

TABLE 4

(Surface Data)

| Surface No. | r | d | nd | vd |
|---|---|---|---|---|
| Object surface | ∞ |  |  |  |
| 1 | 44.22310 | 1.40000 | 1.77250 | 49.6 |
| 2 | 12.90780 | 7.07610 |  |  |
| 3 | −168.80100 | 1.00000 | 1.80755 | 40.9 |
| 4* | 16.37600 | 1.17030 |  |  |
| 5 | 29.02820 | 0.85000 | 1.48749 | 70.4 |
| 6 | 17.53670 | 4.29160 | 1.92286 | 20.9 |
| 7 | 1850.95740 | 2.33650 |  |  |
| 8 | −20.68260 | 0.75000 | 1.77250 | 49.6 |
| 9 | −56.75900 | variable |  |  |
| 10* | 15.79260 | 4.45620 | 1.55352 | 71.4 |
| 11* | −36.09970 | 1.64020 |  |  |
| 12(aperture) | ∞ | 1.55770 |  |  |
| 13 | 46.95460 | 0.70000 | 1.83400 | 37.3 |
| 14 | 13.51480 | 5.84450 | 1.49700 | 81.6 |
| 15 | −15.72050 | 0.20000 |  |  |
| 16 | 18.59030 | 3.76240 | 1.59282 | 68.6 |
| 17 | −21.57760 | 0.60000 | 1.83400 | 37.3 |
| 18 | 84.97910 | variable |  |  |
| 19* | 58.56720 | 0.70000 | 1.68400 | 31.3 |
| 20* | 7.58600 | variable |  |  |
| 21* | 22.18600 | 3.54270 | 1.81607 | 24.1 |
| 22* | −27.99400 | BF |  |  |
| Image surface | ∞ |  |  |  |

TABLE 5

(Aspheric Surface Data)

Fourth surface

κ = −1.12535E−02, A4 = −3.93251E−05, A6 = 5.25752E−08, A8 = −2.13464E−09, A10 = 1.69349E−11, A12 = −6.89571E−14

Tenth surface

κ = 0.00000E+00, A4 = −5.02119E−05, A6 = −5.25951E−07, A8 = 1.46170E−08, A10 = −2.12088E−10, A12 = 0.00000E+00

Eleventh surface

κ = 0.00000E+00, A4 = 6.50935E−05, A6 = −6.56459E−07, A8 = 1.72763E−08, A10 = −2.31591E−10, A12 = 0.00000E+00

Nineteenth surface

κ = 0.00000E+00, A4 = −8.51221E−04, A6 = 5.48290E−05, A8 = −2.04718E−06, A10 = 3.39677E−08, A12 = 0.00000E+00

Twentieth surface

κ = 0.00000E+00, A4 = −9.97137E−04, A6 = 6.46414E−05, A8 = −2.81691E−06, A10 = 4.92889E−08, A12 = 1.85000E−10

Twenty first surface

κ = 0.00000E+00, A4 = 1.03098E−04, A6 = −1.27352E−06, A8 = 1.52294E−07, A10 = −2.05158E−09, A12 = 0.00000E+00

Twenty second surface

κ = 0.00000E+00, A4 = 1.86735E−04, A6 = −3.27827E−06, A8 = 2.46611E−07, A10 = −3.42263E−09, A12 = 0.00000E+00

TABLE 6A (Various Data in Infinity Focusing State)

|  | Wide-angle end | Intermediate position | Telephoto end |
|---|---|---|---|
| Focal length | 4.1966 | 10.2824 | 23.9042 |
| Zoom ratio | 1 | 2.45017 | 5.69609 |
| F number | 1.64659 | 2.36958 | 3.42633 |

TABLE 6A-continued (Various Data in Infinity Focusing State)

|  | Wide-angle end | Intermediate position | Telephoto end |
|---|---|---|---|
| View angle | 62.1204 | 24.7544 | 10.8623 |
| Image height | 4.7000 | 4.7000 | 4.7000 |
| Total lens length | 85.5485 | 69.1188 | 74.7828 |
| BF |  | 5.40362 |  |
| d9 | 34.1496 | 9.8044 | 0.4000 |
| d18 | 1.6271 | 6.0477 | 12.7331 |
| d20 | 2.4900 | 5.9849 | 14.3676 |
| Entrance pupil position | 13.6707 | 12.2537 | 10.9693 |
| Exit pupil position | −25.1487 | −131.7531 | 46.1603 |
| Front principal point | 17.2909 | 21.7653 | 48.8936 |
| Rear principal point | 81.3519 | 58.8364 | 50.8786 |

TABLE 6B

Data of Single Lens

| Lens elements | First surface | Focal length |
|---|---|---|
| 1 | 1 | −24.0653 |
| 2 | 3 | −18.4408 |
| 3 | 5 | −93.1287 |
| 4 | 6 | 19.1628 |
| 5 | 8 | −42.5080 |
| 6 | 10 | 20.4747 |
| 7 | 13 | −22.9727 |
| 8 | 14 | 15.6617 |
| 9 | 16 | 17.4540 |
| 10 | 17 | −20.5806 |
| 11 | 19 | −12.8124 |
| 12 | 21 | 15.6634 |

TABLE 6C

Data of Zoom Lens Groups

| Lens group | First surface | Focal length | Lens configuration length | Front principal point | Rear principal point |
|---|---|---|---|---|---|
| 1 | 1 | −10.86291 | 18.87450 | 4.81414 | 10.48618 |
| 2 | 10 | 14.01194 | 18.76100 | 5.72354 | 9.30847 |
| 3 | 19 | −12.81239 | 0.70000 | 0.48021 | 0.76220 |
| 4 | 21 | 15.66344 | 3.54270 | 0.89074 | 2.41878 |

TABLE 6D

Magnification of Zoom Lens Groups

| Lens groups | First surface | Wide-angle end | Intermediate position | Telephoto end |
|---|---|---|---|---|
| 1 | 1 | 0.00000 | 0.00000 | 0.00000 |
| 2 | 10 | −0.31060 | −0.67471 | −1.23314 |
| 3 | 19 | 2.13250 | 2.40526 | 3.05960 |
| 4 | 21 | 0.58326 | 0.58327 | 0.58324 |

Numerical Practical Example 3

The zoom lens system of numerical practical example 3 corresponds to the third embodiment shown in FIG. 5. Table 7 shows surface data of the zoom lens system of numerical practical example 3; table 8, aspheric data; and tables 9A through 9D, various types of data in the infinity focusing state.

TABLE 7

(Surface Data)

| Surface No. | r | d | nd | vd |
|---|---|---|---|---|
| Object surface | ∞ |  |  |  |
| 1 | 41.48740 | 1.40000 | 1.77250 | 49.6 |
| 2 | 13.93690 | 4.56010 |  |  |
| 3 | 33.79230 | 0.80000 | 1.83481 | 42.7 |
| 4 | 15.95540 | 4.79640 |  |  |
| 5 | −57.80710 | 0.85000 | 1.48749 | 70.4 |
| 6 | 16.63150 | 4.00640 | 1.92286 | 20.9 |
| 7 | 93.18130 | 2.79430 |  |  |
| 8 | −20.16460 | 0.75000 | 1.83481 | 42.7 |
| 9 | −39.34450 | variable |  |  |
| 10* | 15.38870 | 5.00000 | 1.55352 | 71.4 |
| 11* | −50.44810 | 1.70260 |  |  |
| 12(aperture) | ∞ | 0.78230 |  |  |
| 13 | 39.96390 | 0.60000 | 1.83481 | 42.7 |
| 14 | 12.58260 | 5.85760 | 1.49700 | 81.6 |
| 15 | −15.97680 | 0.20000 |  |  |
| 16 | 28.22680 | 3.53870 | 1.59282 | 68.6 |
| 17 | −17.73350 | 0.50000 | 1.80610 | 33.3 |
| 18 | −1290.89970 | variable |  |  |
| 19* | 19.34480 | 1.41040 | 1.68400 | 31.3 |
| 20* | 6.50770 | variable |  |  |
| 21* | 22.74220 | 3.02720 | 1.81607 | 24.1 |
| 22* | −28.46040 | BF |  |  |
| Image surface | ∞ |  |  |  |

TABLE 8

(Aspheric Surface Data)

Tenth surface

κ = 0.00000E+00, A4 = −4.68506E−05, A6 = −5.30856E−07,
A8 = 1.00791E−08, A10 = −1.81092E−10, A12 = 0.00000E+00

Eleventh surface

κ = 0.00000E+00, A4 = 6.06698E−05, A6 = −5.06400E−07,
A8 = 8.66107E−09, A10 = −1.71593E−10, A12 = 0.00000E+00

Nineteenth surface

κ = 0.00000E+00, A4 = −1.21005E−03, A6 = 3.89149E−05,
A8 = −8.79174E−07, A10 = 1.07204E−08, A12 = 0.00000E+00

Twentieth surface

κ = 0.00000E+00, A4 = −1.73368E−03, A6 = 4.63773E−05,
A8 = −1.41376E−06, A10 = 1.68668E−08, A12 = −3.49340E−19

Twenty first surface

κ = 0.00000E+00, A4 = 3.73067E−05, A6 = −1.17150E−06,
A8 = 1.02286E−07, A10 = −1.04772E−09, A12 = 0.00000E+00

Twenty second surface

κ = 0.00000E+00, A4 = 1.03290E−04, A6 = −2.41103E−06,
A8 = 1.38368E−07, A10 = −1.37983E−09, A12 = 0.00000E+00

TABLE 9A (Various Data in Infinity Focusing State)

|  | Wide-angle end | Intermediate position | Telephoto end |
|---|---|---|---|
| Focal length | 4.2999 | 10.2626 | 23.2668 |
| Zoom ratio | 1 | 2.38671 | 5.41101 |
| F number | 1.64794 | 2.36762 | 3.42894 |
| View angle | 63.3793 | 25.1596 | 11.1605 |
| Image height | 4.7000 | 4.7000 | 4.7000 |
| Total lens length | 85.5708 | 70.6071 | 77.5798 |
| BF |  | 5.67200 |  |
| d9 | 32.3766 | 9.1534 | 0.3000 |
| d18 | 2.4074 | 7.6251 | 14.9632 |
| d20 | 2.5388 | 5.5803 | 14.0680 |

TABLE 9A-continued (Various Data in Infinity Focusing State)

|  | Wide-angle end | Intermediate position | Telephoto end |
|---|---|---|---|
| Entrance pupil position | 14.1596 | 12.7931 | 11.6377 |
| Exit pupil position | −25.3898 | −117.0900 | 47.2618 |
| Front principal point | 17.8643 | 22.1978 | 47.9210 |
| Rear principal point | 81.2709 | 60.3445 | 54.3130 |

TABLE 9B

Data of Single Lens

| Lens elements | First surface | Focal length |
|---|---|---|
| 1 | 1 | −27.7831 |
| 2 | 3 | −36.9635 |
| 3 | 5 | −26.3953 |
| 4 | 6 | 21.3996 |
| 5 | 8 | −50.4471 |
| 6 | 10 | 21.8957 |
| 7 | 13 | −22.2202 |
| 8 | 14 | 15.1979 |
| 9 | 16 | 18.9136 |
| 10 | 17 | −22.3095 |
| 11 | 19 | −15.0071 |
| 12 | 21 | 15.9129 |

TABLE 9C

Data of Zoom Lens Groups

| Lens group | First surface | Focal length | Lens configuration length | Front principal point | Rear principal point |
|---|---|---|---|---|---|
| 1 | 1 | −10.99737 | 19.95720 | 5.23278 | 10.94719 |
| 2 | 10 | 14.87183 | 18.18120 | 5.70320 | 9.21669 |
| 3 | 19 | −15.00705 | 1.41040 | 1.32106 | 1.85481 |
| 4 | 21 | 15.91285 | 3.02720 | 0.76058 | 2.07539 |

TABLE 9D

Magnification of Zoom Lens Groups

| Lens groups | First surface | Wide-angle end | Intermediate position | Telephoto end |
|---|---|---|---|---|
| 1 | 1 | 0.00000 | 0.00000 | 0.00000 |
| 2 | 10 | −0.34413 | −0.74388 | −1.33514 |
| 3 | 19 | 1.94636 | 2.14908 | 2.71474 |
| 4 | 21 | 0.58374 | 0.58373 | 0.58370 |

Numerical Practical Example 4

The zoom lens system of numerical practical example 4 corresponds to the fourth embodiment shown in FIG. 7. Table 10 shows surface data of the zoom lens system of numerical practical example 4; table 11, aspheric data; and tables 12A through 12D, various types of data in the infinity focusing state.

TABLE 10

(Surface Data)

| Surface No. | r | d | nd | vd |
|---|---|---|---|---|
| Object surface | ∞ |  |  |  |
| 1 | 33.83670 | 1.59750 | 1.83481 | 42.7 |
| 2 | 11.59170 | 3.11780 |  |  |
| 3* | 14.59770 | 1.99730 | 1.54360 | 56.0 |
| 4* | 9.99940 | 7.65060 |  |  |
| 5 | −20.14570 | 0.90000 | 1.48749 | 70.4 |
| 6 | 19.91660 | 3.99060 | 1.92286 | 20.9 |
| 7 | −103.76070 | 1.79860 |  |  |
| 8 | −21.31080 | 0.90000 | 1.90366 | 31.3 |
| 9 | −53.37470 | variable |  |  |
| 10 (aperture) | ∞ | 1.00460 |  |  |
| 11* | 14.89110 | 4.10470 | 1.58313 | 59.4 |
| 12* | −51.19380 | 3.15950 |  |  |
| 13 | 32.06050 | 0.69700 | 1.90366 | 31.3 |
| 14 | 11.68670 | 5.29120 | 1.49700 | 81.6 |
| 15 | −21.73650 | 0.19750 |  |  |
| 16 | 25.91760 | 0.70790 | 1.77250 | 49.6 |
| 17 | 9.85620 | 4.03460 | 1.59282 | 68.6 |
| 18 | −378.04720 | variable |  |  |
| 19* | 18.25190 | 0.72640 | 1.68893 | 31.1 |
| 20* | 8.18030 | variable |  |  |
| 21 | 35.41900 | 2.21820 | 1.84666 | 23.8 |
| 22 | −37.13850 | BF |  |  |
| Image surface | ∞ |  |  |  |

TABLE 11

(Aspheric Surface Data)

Third surface

κ = 0.00000E+00, A4 = 9.12133E−06, A6 = −1.92992E−07,
A8 = 4.91765E−09, A10 = −1.66777E−11, A12 = 5.53319E−14,
A14 = −8.76679E−16
Fourth surface κ = −1.11833E−01, A4 = −2.81504E−05, A6 = −5.72615E−07,
A8 = 9.57864E−10, A10 = 1.67073E−10, A12 = −2.15488E−12,
A14 = 9.03303E−16
Eleventh surface κ = 0.00000E+00, A4 = −3.86172E−05, A6 = 1.43505E−08,
A8 = 1.16467E−09, A10 = −2.40201E−11, A12 = 0.00000E+00,
A14 = 0.00000E+00
Twelfth surface κ = 0.00000E+00, A4 = 5.56813E−05, A6 = −3.23578E−08,
A8 = 1.71435E−09, A10 = −3.19269E−11, A12 = 3.09290E−14,
A14 = 0.00000E+00
Nineteenth surface κ = 0.00000E+00, A4 = −1.74893E−03, A6 = 6.58093E−05,
A8 = −1.52022E−06, A10 = 1.56548E−08, A12 = 0.00000E+00,
A14 = 0.00000E+00
Twentieth surface κ = 0.00000E+00, A4 = −2.04922E−03, A6 = 7.30612E−05,
A8 = −1.86315E−06, A10 = 2.02222E−08, A12 = 0.00000E+00,
A14 = 0.00000E+00

TABLE 12A (Various Data in Infinity Focusing State)

|  | Wide-angle end | Intermediate position | Telephoto end |
|---|---|---|---|
| Focal length | 4.3944 | 9.8343 | 20.8758 |
| Zoom ratio | 1 | 2.23792 | 4.75055 |
| F number | 1.65317 | 2.26123 | 3.51569 |
| View angle | 64.0909 | 26.9414 | 12.8251 |
| Image height | 4.7000 | 4.7000 | 4.7000 |
| Total lens length | 84.6005 | 74.2934 | 84.6875 |
| BF |  | 5.89584 |  |

TABLE 12A-continued (Various Data in Infinity Focusing State)

|  | Wide-angle end | Intermediate position | Telephoto end |
|---|---|---|---|
| d9 | 28.6063 | 9.3052 | 2.0012 |
| d18 | 2.1062 | 6.1302 | 9.6858 |
| d20 | 3.8982 | 8.8682 | 23.0109 |
| Entrance pupil position | 13.4445 | 12.0701 | 10.9206 |
| Exit pupil position | −53.0046 | −933.9744 | 54.0049 |
| Front principal point | 17.5110 | 21.8016 | 40.8550 |
| Rear principal point | 80.2061 | 64.4591 | 63.8117 |

TABLE 12B

Data of Single Lens

| Lens elements | First surface | Focal length |
|---|---|---|
| 1 | 1 | −21.8345 |
| 2 | 3 | −68.9414 |
| 3 | 5 | −20.3944 |
| 4 | 6 | 18.3908 |
| 5 | 8 | −39.7869 |
| 6 | 11 | 20.2456 |
| 7 | 13 | −20.6870 |
| 8 | 14 | 16.1409 |
| 9 | 16 | −20.9916 |
| 10 | 17 | 16.2664 |
| 11 | 19 | −22.1703 |
| 12 | 21 | 21.7169 |

TABLE 12C

Data of Zoom Lens Groups

| Lens group | First surface | Focal length | Lens configuration length | Front principal point | Rear principal point |
|---|---|---|---|---|---|
| 1 | 1 | −10.06711 | 21.95240 | 5.46308 | 12.03443 |
| 2 | 10 | 15.26773 | 19.19700 | 6.00135 | 9.28191 |
| 3 | 19 | −22.17031 | 0.72640 | 0.80305 | 1.08632 |
| 4 | 21 | 21.71690 | 2.21820 | 0.59470 | 1.59463 |

TABLE 12D

Magnification of Zoom Lens Groups

| Lens groups | First surface | Wide-angle end | Intermediate position | Telephoto end |
|---|---|---|---|---|
| 1 | 1 | 0.00000 | 0.00000 | 0.00000 |
| 2 | 10 | −0.38824 | −0.76248 | −1.20030 |
| 3 | 19 | 1.60663 | 1.83080 | 2.46869 |
| 4 | 21 | 0.69980 | 0.69980 | 0.69981 |

Corresponding Values for Each Condition

Table 13 below shows corresponding values for each condition in the zoom lens system of each numerical practical example.

TABLE 13

| | Conditions | Min. | Max. | Numerical practical examples 1 | 2 | 3 | 4 |
|---|---|---|---|---|---|---|---|
| (1) | Lw/{fw × tan(ωw)} | 8 | 15 | 10.003 | 10.784 | 9.974 | 9.352 |
| (2) | ft/fw | 4.5 | — | 5.694 | 5.696 | 5.411 | 4.751 |
| (3) | (R1 + R2)/(R1 − R2) | −4 | −1.1 | −2.272 | −2.147 | −3.103 | −2.329 |
| (4) | ωw | 50 | 70 | 63.401 | 62.120 | 63.379 | 64.091 |
| (5) | f1/fw | −3.5 | −2 | −2.550 | −2.589 | −2.558 | −2.291 |
| (6) | vd1n | 60 | — | 70.400 | 70.400 | 70.400 | 70.400 |
| (7) | f2/fw | 2.8 | 4 | 3.252 | 3.339 | 3.459 | 3.474 |
| (8) | vd2p | 65 | — | 73.867 | 73.867 | 73.867 | 73.867 |
| (9) | f3/fw | −6 | −2 | −2.856 | −3.053 | −3.490 | −5.045 |
| (10) | f4/fw | 3 | 5.3 | 3.448 | 3.732 | 3.701 | 4.942 |

INDUSTRIAL APPLICABILITY

A zoom lens system according to the present disclosure is applicable to a digital still camera, an interchangeable lens digital camera, a digital video camera, a camera unit of a mobile phone, a camera unit of a personal digital assistance (PDA), a monitoring camera in a monitoring system, a web camera, and a vehicle-mounted camera, for example, and is ideal especially for a photographing optical system requiring high image quality such as a digital still camera system and a digital video camera system.

What is claimed is:

1. A zoom lens system having a plurality of lens groups each composed of at least one lens element, comprising, in the following order from an object side toward an image side:

a first lens group with negative power;
a second lens group with positive power;
a third lens group with negative power; and
a fourth lens group with positive power,
wherein the first lens group includes, in the following order from the object side toward the image side:
a first lens element having a negative meniscus shape with a concave surface of the shape facing the image side,
a second lens element having a negative meniscus shape with a concave surface of the shape facing the image side,
a third lens element with a concave surface of the element facing the image side,
a fourth lens element with a convex surface of the element facing the object side, and a fifth lens element with a concave surface of the element facing the object side,
wherein the third lens element and the fourth lens element compose a cemented lens, and
satisfying conditional expression (4) below, $$50 \leq \omega w \leq 70 \quad (4)$$

where
$\omega w$ is a half view angle (°) at a wide-angle end.

2. The zoom lens system of claim 1, wherein the zoom lens system moves the first lens group, the second lens group, and the third lens group along an optical axis to zoom from a wide-angle end to a telephoto end during photographing and satisfies conditional expressions (1) and (2) below, $$8.0 \leq Lw/\{fw \times \tan(\omega w)\} \leq 15 \quad (1)$$

$$ft/fw \geq 4.5 \quad (2)$$

where
Lw is a total optical length at the wide-angle end,
$\omega w$ is a half view angle (°) at the wide-angle end,
fw is a focal length of an entire system at the wide-angle end, and
ft is a focal length of the entire system at the telephoto end.

3. The zoom lens system of claim 1, wherein a lens element closest to the image side, of the first lens group has negative power and satisfies conditional expression (3) below, $$-4.0 \leq (R1+R2)/(R1-R2) \leq -1.1 \quad (3)$$

where
R1 is an object-side curvature radius of the lens element positioned closest to the image side in the first lens group, and
R2 is an image-side curvature radius of the lens element positioned closest to the image side in the first lens group.

4. A zoom lens system having a plurality of lens groups each composed of at least one lens element, comprising, in the following order from an object side toward an image side:
a first lens group with negative power;
a second lens group with positive power;
a third lens group with negative power; and
a fourth lens group with positive power,
wherein the first lens group includes, in the following order from the object side toward the image side:
a first lens element having a negative meniscus shape with a concave surface of the shape facing the image side,
a second lens element having a negative meniscus shape with a concave surface of the shape facing the image side,
a third lens element with a concave surface of the element facing the image side,
a fourth lens element with a convex surface of the element facing the object side, and
a fifth lens element with a concave surface of the element facing the object side,
wherein the third lens element and the fourth lens element compose a cemented lens, and
wherein the zoom lens system satisfies conditional expression (5) below, $$-3.5 \leq f1/fw \leq -2.0 \quad (5)$$

where
f1 is a focal length of the first lens group, and
fw is a focal length of an entire system at the wide-angle end.

5. The zoom lens system of claim 4 satisfying conditional expression (4) below, $$50 \leq \omega w \leq 70 \quad (4)$$

where
$\omega w$ is a half view angle (°) at a wide-angle end.

6. The zoom lens system of claim 1, wherein a lens element with negative power of the cemented lens included in the first lens group satisfies conditional expression (6) below, $$vd1n \geq 60 \quad (6)$$

where
vd1n is an Abbe number of the lens element with negative power of two lens elements composing the cemented lens.

7. The zoom lens system of claim 1 satisfying conditional expression (7) below, $$2.8 \leq f2/fw \leq 4.0 \quad (7)$$

where
f2 is a focal length of the second lens group, and
fw is a focal length of an entire system at the wide-angle end.

8. The zoom lens system of claim 1, wherein an average value of Abbe numbers of all lens elements with positive power in the second lens group satisfies conditional expression (8) below, $$vd2p \geq 65 \quad (8)$$

where
vd2p is the average value of the Abbe numbers of the lens elements with positive power in the second lens group.

9. The zoom lens system of claim 1, wherein the zoom lens system moves the third lens group toward the image side to focus from an infinity focusing state to a finite distance focusing state and satisfies conditional expression (9) below, $$-6.0 \leq f3/fw \leq -2.0 \quad (9)$$

where
f3 is a focal length of the third lens group, and
fw is a focal length of an entire system at a wide-angle end.

10. The zoom lens system of claim 1, wherein the fourth lens group stays still with respect to an image surface when zooming from a wide-angle end to a telephoto end and satisfies conditional expression (10) below, $$3.0 \leq f4/fw \leq 5.3 \quad (10)$$

where
f4 is a focal length of the fourth lens group, and
fw is a focal length of an entire system at the wide-angle end.

11. An image capturing device comprising the zoom lens system of claim 1 and an imaging element photoreceiving an image formed by the zoom lens system.

12. The zoom lens system of claim 1, wherein the zoom lens system satisfies conditional expression (5) below, $$-3.5 \leq f1/fw \leq -2.0 \quad (5)$$

where
f1 is a focal length of the first lens group, and
fw is a focal length of an entire system at the wide-angle end.

13. The zoom lens system of claim 4, wherein the zoom lens system moves the first lens group, the second lens group, and the third lens group along an optical axis to zoom from a wide-angle end to a telephoto end during photographing and satisfies conditional expressions (1) and (2) below, $$8.0 \le Lw/\{fw \times \tan(\omega w)\} \le 15 \quad (1)$$

$$ft/fw \ge 4.5 \quad (2)$$

where
Lw is a total optical length at the wide-angle end,
ωw is a half view angle (°) at the wide-angle end,
fw is a focal length of an entire system at the wide-angle end, and
ft is a focal length of the entire system at the telephoto end.

14. The zoom lens system of claim 4, wherein a lens element closest to the image side, of the first lens group has negative power and satisfies conditional expression (3) below, $$-4.0 \le (R1+R2)/(R1-R2) \le -1.1 \quad (3)$$

where
R1 is an object-side curvature radius of the lens element positioned closest to the image side in the first lens group, and
R2 is an image-side curvature radius of the lens element positioned closest to the image side in the first lens group.

15. The zoom lens system of claim 4, wherein a lens element with negative power of the cemented lens included in the first lens group satisfies conditional expression (6) below, $$vd1n \ge 60 \quad (6)$$

where
vd1n is an Abbe number of the lens element with negative power of two lens elements composing the cemented lens.

16. The zoom lens system of claim 4 satisfying conditional expression (7) below, $$2.8 \le f2/fw \le 4.0 \quad (7)$$

where
f2 is a focal length of the second lens group, and
fw is a focal length of an entire system at the wide-angle end.

17. The zoom lens system of claim 4, wherein an average value of Abbe numbers of all lens elements with positive power in the second lens group satisfies conditional expression (8) below, $$vd2p \ge 65 \quad (8)$$

where
vd2p is the average value of the Abbe numbers of the lens elements with positive power in the second lens group.

18. The zoom lens system of claim 4, wherein the zoom lens system moves the third lens group toward the image side to focus from an infinity focusing state to a finite distance focusing state and satisfies conditional expression (9) below, $$-6.0 \le f3/fw \le -2.0 \quad (9)$$

where
f3 is a focal length of the third lens group, and
fw is a focal length of an entire system at a wide-angle end.

19. The zoom lens system of claim 4, wherein the fourth lens group stays still with respect to an image surface when zooming from a wide-angle end to a telephoto end and satisfies conditional expression (10) below, $$3.0 \le f4/fw \le 5.3 \quad (10)$$

where
f4 is a focal length of the fourth lens group, and
fw is a focal length of an entire system at the wide-angle end.

20. An image capturing device comprising the zoom lens system of claim 4 and an imaging element photoreceiving an image formed by the zoom lens system.

* * * * *